United States Patent
Shiramizu

[11] Patent Number: 5,627,596
[45] Date of Patent: May 6, 1997

[54] VIDEO SYNCHRONIZATION CIRCUIT COMPRISING A PLL WITH A CIRCUIT TO SET THE FREQUENCY OF THE OUTPUT SIGNAL WHEN THE FEEDBACK SIGNAL IS NOT PRESENT

[75] Inventor: Hisatoshi Shiramizu, Chikugo, Japan

[73] Assignee: Rohm Co. Ltd., Kyoto, Japan

[21] Appl. No.: 499,503

[22] Filed: Jul. 7, 1995

[30] Foreign Application Priority Data

Jul. 13, 1994 [JP] Japan .................................. 6-161337

[51] Int. Cl.[6] .................................................. H04N 5/04
[52] U.S. Cl. .................................. 348/536; 348/521
[58] Field of Search ........................ 348/521, 501, 348/511, 516, 536, 540, 546, 547, 548; 358/150; 331/1 A, 25, 17; 327/156, 159, 162, 141, 142, 147; H04N 5/04, 5/12

[56] References Cited

U.S. PATENT DOCUMENTS

| | | |
|---|---|---|
| 3,921,094 | 11/1975 | Schaible .................................. 331/1 A |
| 3,983,506 | 9/1976 | Rettinger, Jr. .............................. 331/17 |
| 4,520,394 | 5/1985 | Kaneko ................................... 358/150 |
| 4,780,759 | 10/1988 | Matsushima et al. ................... 358/148 |
| 4,812,783 | 3/1989 | Honjo et al. .............................. 331/20 |
| 4,843,469 | 6/1989 | Boyce ..................................... 358/148 |
| 5,359,297 | 10/1994 | Hodel et al. ............................. 331/1 A |
| 5,410,572 | 4/1995 | Yoshida ................................... 375/376 |
| 5,502,502 | 3/1996 | Gaskill et al. ........................... 348/546 |

Primary Examiner—Michael H. Lee
Assistant Examiner—Chris Grant
Attorney, Agent, or Firm—Nikaido Marmelstein Murray & Oram LLP

[57] ABSTRACT

A video system pulse generating circuit has the frequency of the video system pulse being an integral multiple of a video synchronizing signal, and being synchronized with video synchronizing signal. The video system pulse generating circuit includes a phase locked loop circuit, a dividing circuit, and a synchronizing range determining circuit, wherein an asynchronous oscillator such as a quartz oscillator is not required.

2 Claims, 3 Drawing Sheets

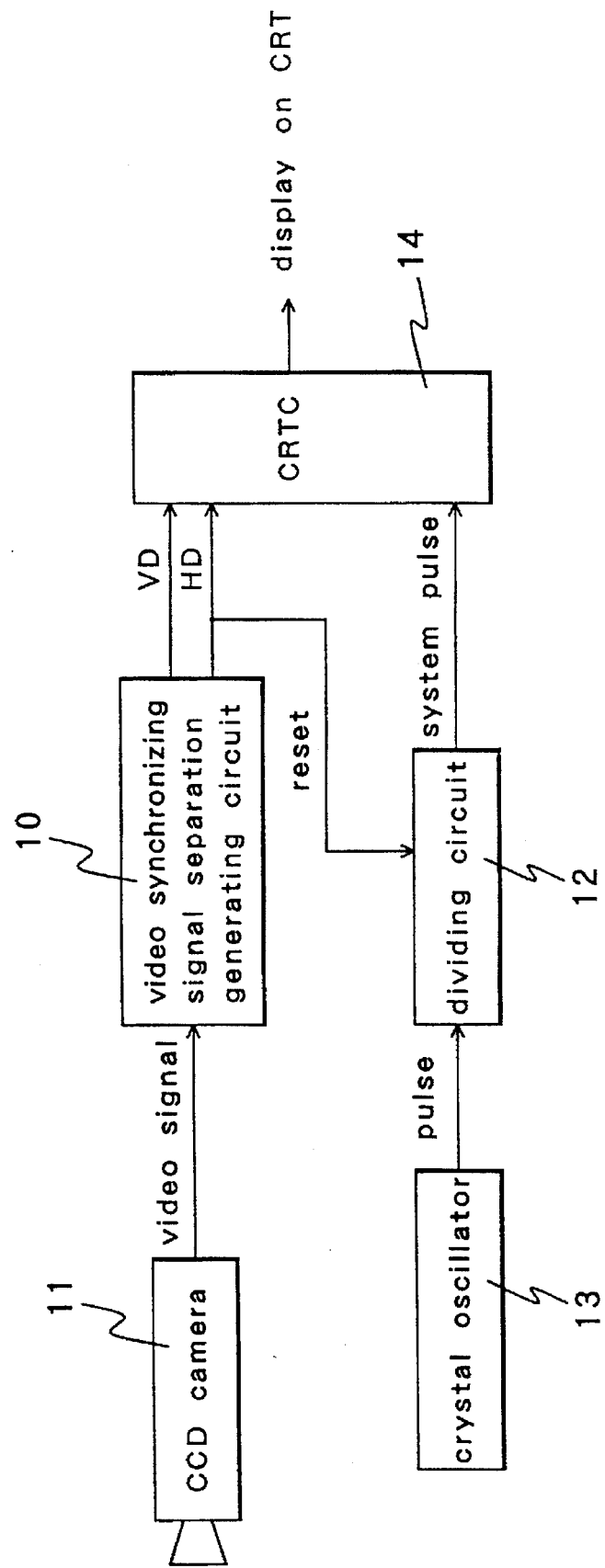

5,627,596

VIDEO SYNCHRONIZATION CIRCUIT COMPRISING A PLL WITH A CIRCUIT TO SET THE FREQUENCY OF THE OUTPUT SIGNAL WHEN THE FEEDBACK SIGNAL IS NOT PRESENT

BACKGROUND OF THE INVENTION

The present invention relates to a video system pulse generating circuit. More particularly, it relates to a generating circuit of a video system pulse which is a clock pulse as a reference synchronized with an input image input into a signal control section when displaying an image picked up with a camera or the like in a monitor TV or the like.

Herein, the video system pulse (hereinafter referred to as "system pulse") refers to a clock pulse as a reference necessary for driving a display for showing a video signal.

In a video processing system for displaying a video signal input from an image pickup device 11 such as a CCD camera in a display device such as a television monitor, the system pulse that can be provided to a CRTC which is a necessary control unit for controlling signal from a camera or the like or a monitor TV display control is generated conventionally in a circuit as shown in FIG. 3. First, the video signal picked up with the CCD camera 11 is input into a video synchronizing signal separation genarating circuit 10, and a horizontal synchronizing signal (HD) and a vertical synchronizing signal (VD) are output as video synchronizing signals. The horizontal synchronizing signal (HD) and the vertical synchronizing signal (VD) are input into a CRT display control IC (hereinafter referred to as "CRTC") 14, and the horizontal synchronizing signal (HD) is also used for resetting a dividing circuit 12. The system pulse necessary for operating the CRTC is reset by the horizontal synchronizing signal and is matched in phase as the clock pulse from a quartz oscillator 13 and is set to the same frequency as the synchronizing signal of the video signal from the dividing circuit 12, and the system pulse synchronized with the video synchronizing signal is provided for the CRTC for display control of monitor TV.

The CRTC is an IC or an arbitrarily designed circuit for performing necessary control such as a control of signal from the camera in an image processing system or a control of monitor TV display.

In the conventional image processing system, the frequency of the system pulse must be an integral multiple of the frequency of the video synchronizing signal, but since the frequency of the video synchronizing signal itself is unstable and fluctuates due to noise contained in the video signal or errors in the video synchronizing signal separation generating circuit itself, there is no quartz oscillator having the frequency perfectly matching with an integral multiple of the frequency of the video synchronizing signal. Furthermore, by resetting the dividing circuit with the video synchronizing signal, the system pulse and the video synchronizing signal are synchronized with each other, but supposing N to be an integer, if a relationship of the video synchronizing signal frequency×N=frequency of the system pulse is not established perfectly, the system pulse and the video synchronizing signal are synchronized with each other only right after resetting the dividing circuit, and thereafter the system pulse and the video synchronizing signal differ in frequency and are no longer synchronized, and inputting an accurate video signal and displaying are disabled, and thereby the entire video processing system fails to function.

The invention is devised to solve these problems, and it is an object thereof to present a circuit for generating the video system pulse synchronized perfectly with the video synchronizing signal, by generating a pulse having a frequency of an arbitrary integral multiple of the frequency of the video synchronizing signal deriving from the video synchronizing signal only.

SUMMARY OF THE INVENTION

To achieve the object, the invention provides a video system pulse generating circuit, for generating a video system pulse for driving an image processing system, the video system pulse having a frequency of an integral multiple of a frequency of an input video synchronizing signal and being synchronized with the video synchronizing signal, comprising: a phase locked loop circuit for receiving the video synchronizing signal and an output signal of the circuit for generating the video system pulse, and synchronizing phases of the video synchronizing signal and of the output signal of the circuit for generating the video system pulse; a dividing circuit for reducing a frequency of an output of the phase locked loop circuit to 1/N (wherein N is an integer); and a synchronizing range determining circuit connected to the phase locked loop circuit in order to set a frequency of an output signal to an expected value of the video system pulse instead of the frequency of the video system pulse which is fed back and input into the phase locked loop circuit.

It is preferable that upon start of synchronizing operation in the synchronizing range determining circuit, when the video system pulse is not generated, a signal to be input into the phase locked loop circuit instead of the video system pulse is a pulse from the synchronizing range determing circuit.

Furthermore, it is preferable that the synchronizing range determining circuit is designed so that a current of an emitter coupled multivibrator circuit is controlled.

In the video system pulse generating circuit of the invenion, since the video system pulse is generated from the video synchronizing signal, a pulse having a frequency of an integral multiple of a frequency of a pulse of a video synchronizing system can be always generated regardless of stability or instability of the video signal.

BRIEF DESCRIPTION OF THE DRAWINGS

FIG. 3 is a block diagram illustrating a reproducing procedure of a video signal in prior art.

DETAILED DESCRIPTION

Referring now to the accompanying drawings, the video system pulse generating circuit of the invention is described as follows.

Figure 1:
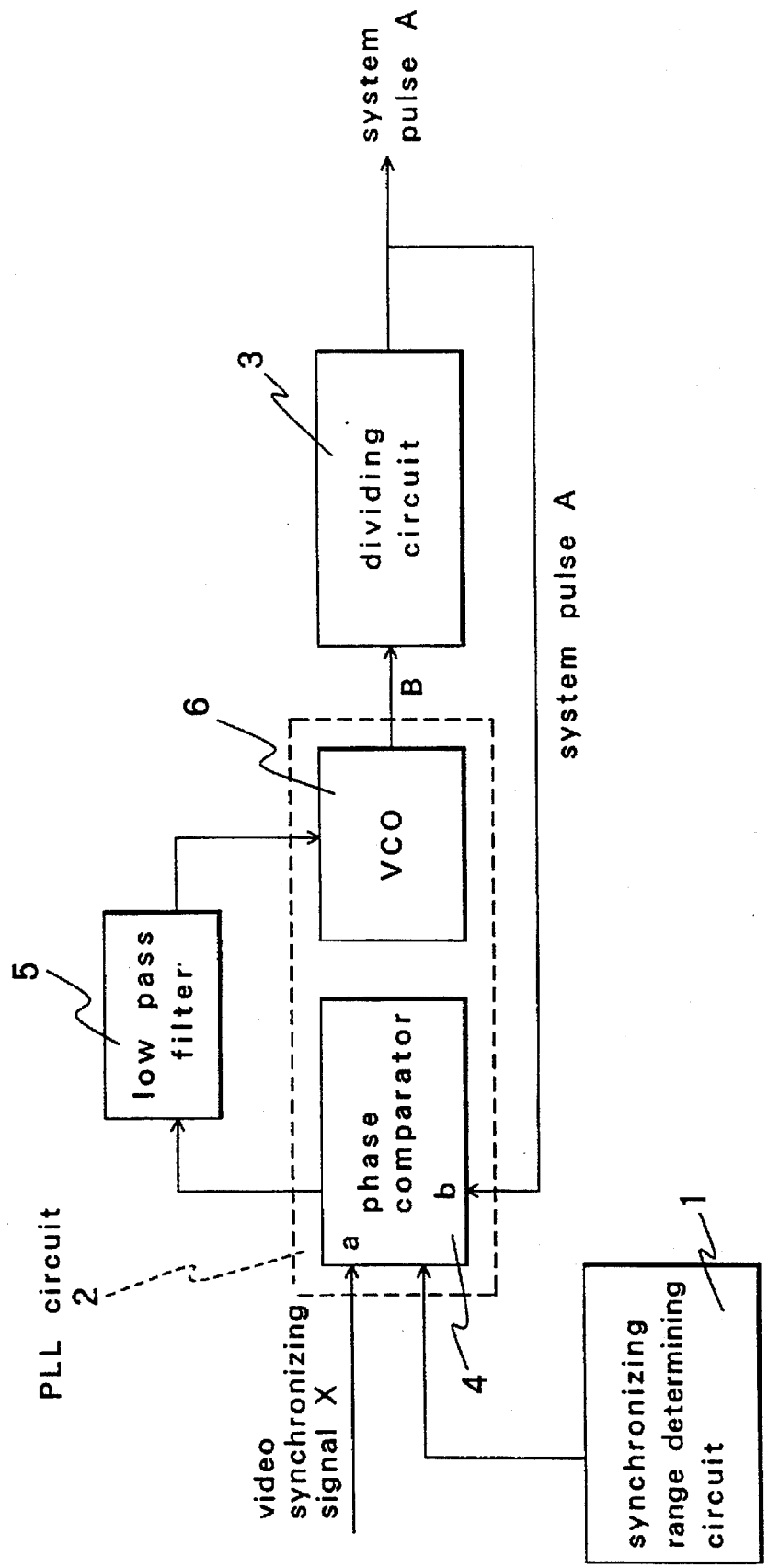
FIG. 1 is a block diagram illustrating an embodiment of the video system pulse generating circuit of the invention.

FIG. 1 is a block diagram illustrating an embodiment of the video system pulse generating circuit of the invention.

Figure 2:
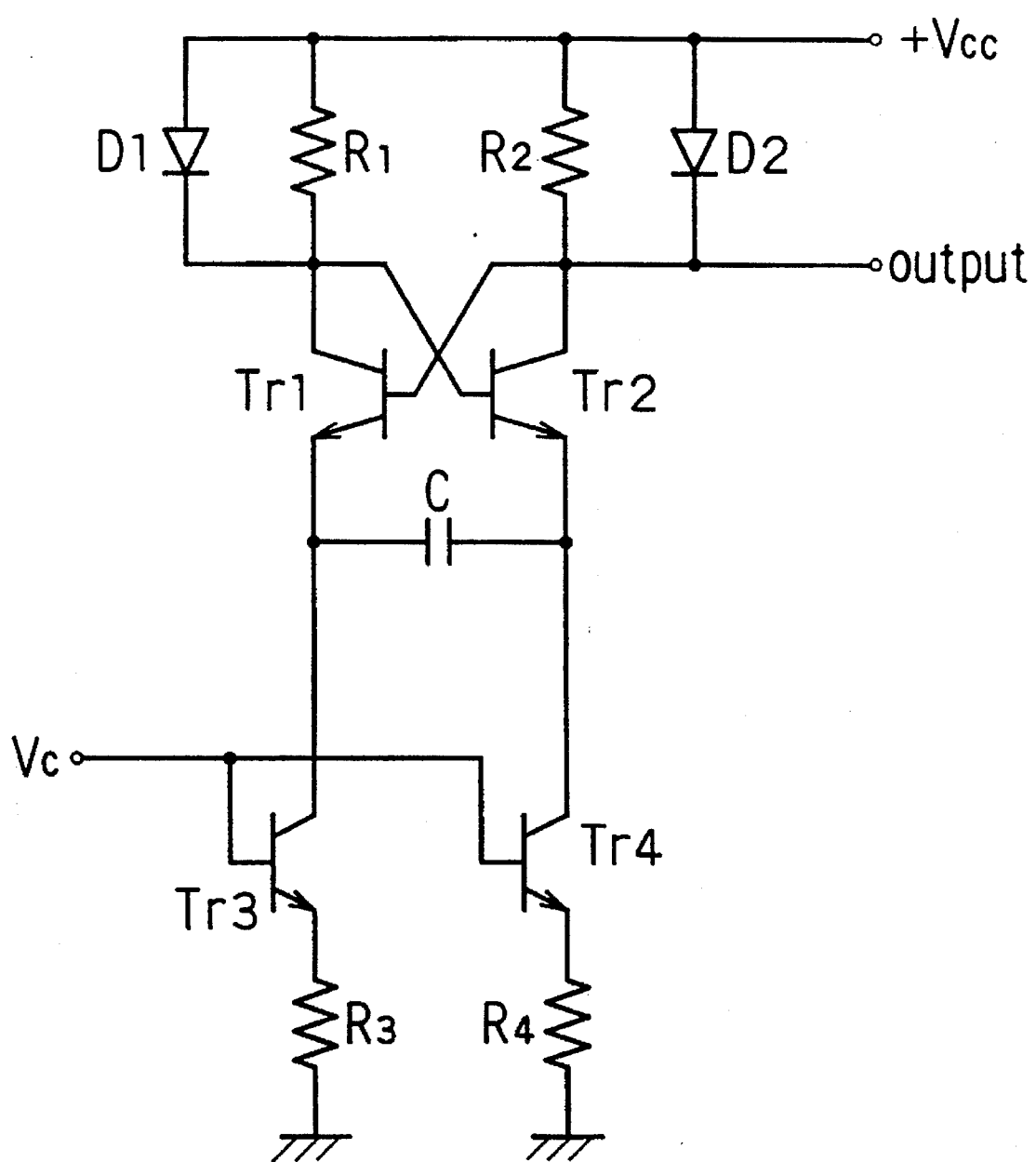
FIG. 2 illustrates an equivalent circuit diagram of VCO including the synchronizing range detemining circuit in the circuit illustrated in FIG. 1.

The system pulse generating circuit of the invention comprises, as shown in FIG. 1, a phase locked loop (hereinafter referred to as "PLL") circuit 2 which receives a video synchronizing signal X generated in a video synchronizing signal separation generating circuit based on the video signal picked up with a CCD camera or the like, and a system pulse A which is an output of this circuit, at input terminals a, b, respectively, and synchronizes the input video synchronizing signal X with the output system pulse A in phase, a 1/N dividing circuit 3 which reduces the frequency of the output B of the PLL circuit 2 to 1/N (wherein N is an integer), and a synchronizing range determining circuit 1 for generating a pulse to be input to the PLL circuit 2 instead of the system pulse A when the system pulse A is not generated upon start of operation. The PLL circuit 2 comprises a phase comparator 4 and a voltage controlled oscillator (hereinafter referred to as "VCO") 6, and a low pass filter 5 for removing high frequency noise is also connected to the PLL circuit 2. The VCO 6 in the PLL circuit 2 comprises an emitter coupled multivibrator circuit for example, as shown in FIG. 2 in which two sets of transistors, each set comprising two transistors Tr1 and Tr3, and Tr2 and Tr4 connected in series, respectively are connected parallel symmetrically. The synchronizing range determining circuit includes a capacitor C connected between connection points, each connection point being between the two trasisitors Tr1 and Tr3, and Tr2 and Tr4, respectively, and resistors $R_1$ and $R_2$ connected between the power supply terminal Vcc and collectors of the first and the second transistors Tr1, Tr2, thereby controlling the current of the emitter coupled multivibrator circuit. In FIG. 2, meanwhile, D1, D2 are diodes for adjusting the output pulses, and $R_3$, $R_4$ are resistors for determining the current of a constant current source.

The PLL circuit 2 comprises the phase comparator 4 and the VCO 6. The video synchronizing signal X which is an input signal at a terminal a of the phase comparator 4, and the system pulse A which is an input signal at a terminal b are compared to each other in phase, and these two input signals are synchronized. For example, when the phase of the input terminal a is advanced from the phase of b, the frequency of b is increased, or when the phase of b is advanced from the phase of a, the frequency of b is decreased. When there is no difference between the two phases, the same pulse as the center frequency of the VCO 6 is output. The phase comparator 4 and the VCO 6 of the PLL circuit 2 are connected through the low pass filter 5 for removing noise. The frequency as a reference of the output pulse of the VCO 6 is determined by the time constant by the capacitor C and resistors $R_1$, $R_2$ of the synchronizing range determining circuit 1. Furthermore, by changing the current by the input Vc, the output frequency is controlled.

In this circuit, from the CCD camera or the television or the like, the video synchronizing signal is picked up by an ordinary video synchronizing signal separation generating circuit or the like, and the signal is input at the input terminals a, b of the PLL circuit 2, together with the system pulse which is the output of this circuit. An output signal B is output from the PLL circuit 2, and this output signal B is the pulse synchronized with the two pulses of the video synchronizing signal X input into the PLL circuit 2 and of the system pulse A. However, upon start of synchronizing operation, since the system pulse is not established, the pulse from the synchronizing range determining circuit 1 is used as the output signal B from the PLL circuit 2.

Subsequently, the output signal B output from the PLL circuit 2 is input into the 1/N dividing circuit 3. In the dividing circuit 3, the frequency of the signal B is reduced to 1/N, and thus reduced signal B is output as a system pulse A. A part of the system pulse is fed back into the PLL circuit 2.

By repeating this operation, the output system pulse A becomes a pulse having a frequency of an integral multiple (N times) of the frequency of the video synchronizing signal. If not upon start of synchronizing operation, when the frequency of the video synchronizing signal temporarily becomes unstable, synchronism of the video synchronizing signal and the system pulse may fail to work normally, and in such a case the frequency of the output signal from the synchronizing range determining circuit 1 is set to an expected value of the system pulse, and the synchronizing range determining circuit is controlled so that the output signal which is set to the expected value may be input into the PLL circuit. By so setting, the system pulse having N times the frequency of the video synchronizing signal may be always obtained.

As described herein, according to the video system pulse generating circuit of the invention, always synchronizing with the video synchronizing signal in a simple circuit, the system pulse having a frequency of an integral multiple of the video synchronizing signal may be obtained. Therefore, it is not necessary to synchronize with an asynchronous oscillator such as a quartz oscillator, synchronism is achieved securely, and the cost of the products according to the present invention can be saved because a quartz oscillator is not required, and moreover a picture of high quality may be obtained.

With only certain presently preferred embodiments have been described in detail, as will be apparent with those familiar with the art, certain changes and modifications can be made without departing from the spirit and scope of the invention as defined by the following claims.

What is claimed is:

1. A video system pulse generating circuit for generating a video system pulse for driving an image processing system, the video system pulse having a frequency of an integral multiple of a frequency of an input video synchronizing signal and being synchronized with the video synchronizing signal, comprising:

(a) a phase locked loop circuit for receiving the video synchronizing signal and an output signal of the circuit for generating the video system pulse, and for synchronizing phases of the video synchronizing signal and of the output signal of the circuit for generating the video system pulse;

(b) a dividing circuit for reducing a frequency of an output of the phase locked loop circuit to 1/N (wherein N is an integer); and (c) a synchronizing range determining circuit connected to the phase locked loop circuit in order to set a frequency of an output signal to an expected value of the video system pulse instead of the frequency of the video system pulse which is fed back and input into the phase locked loop circuit, wherein, upon start of synchronizing operation in the synchronizing range determining circuit, when the video system pulse is not generated, a signal to be input into the phase locked loop circuit instead of the video system pulse is a pulse from the synchronizing range determining circuit.

2. The video system pulse generating circuit of claim 1, wherein the synchronizing range determining circuit is designed so that a current of an emitter coupled multivibrator circuit is controlled.

* * * * *